United States Patent [19]

Jostein

[11] Patent Number: 5,760,292
[45] Date of Patent: Jun. 2, 1998

[54] MONITORING SYSTEM FOR HIGH PRESSURE FLUID FLOW CONNECTOR

[75] Inventor: Erstad Jostein, Bergen, Norway

[73] Assignee: Framo Engineering AS, Nesttun, Norway

[21] Appl. No.: 558,512

[22] Filed: Nov. 16, 1995

[30] Foreign Application Priority Data

Nov. 1, 1995 [GB] United Kingdom ............ 9522340

[51] Int. Cl.$^6$ .................................................. G01M 3/08
[52] U.S. Cl. ......................................... 73/46; 73/40
[58] Field of Search ............................. 73/46, 37, 40, 73/4 R; 137/625.4, 557

[56] References Cited

U.S. PATENT DOCUMENTS

| | | | |
|---|---|---|---|
| 1,731,519 | 7/1929 | Bastian | 73/46 |
| 2,908,158 | 10/1959 | Jacobsson | 73/46 |
| 3,187,561 | 6/1965 | Spalding | 73/46 |
| 3,233,447 | 2/1966 | Horrell | 73/46 |
| 3,344,807 | 10/1967 | Lehrer et al. | 73/46 |
| 3,351,360 | 11/1967 | Faccou | 285/41 |
| 3,511,082 | 5/1970 | Lathrop et al. | 73/46 |
| 3,633,618 | 1/1972 | Blackmore et al. | 137/597 |
| 3,719,070 | 3/1973 | Hanes | 73/46 |
| 3,884,511 | 5/1975 | Hermanson | 285/93 |
| 3,987,817 | 10/1976 | Peters | 137/625.4 |
| 4,423,751 | 1/1984 | Roettgen | 137/557 |
| 4,445,531 | 5/1984 | Powell | 137/492 |
| 4,462,619 | 7/1984 | Hotger | 285/94 |
| 4,465,104 | 8/1984 | Wittman et al. | 138/39 |
| 4,481,805 | 11/1984 | Dobesh | 73/3 |
| 4,602,806 | 7/1986 | Saliger | 285/41 |
| 4,647,077 | 3/1987 | Ethridge et al. | 285/98 |
| 4,669,758 | 6/1987 | Feller et al. | 285/94 |
| 4,747,425 | 5/1988 | Lauer | 137/116.3 |
| 4,796,661 | 1/1989 | Hishinuma et al. | 137/487.5 |
| 4,819,966 | 4/1989 | Gibb | 285/18 |
| 4,828,292 | 5/1989 | Jansen | 285/93 |
| 4,830,045 | 5/1989 | Fujikawa et al. | 137/456 |
| 4,901,751 | 2/1990 | Story et al. | 73/46 |
| 4,928,997 | 5/1990 | Reisener et al. | 285/13 |
| 5,052,694 | 10/1991 | Lipschitz | 277/3 |
| 5,052,720 | 10/1991 | Yoda | 285/14 |
| 5,056,719 | 10/1991 | Lauter et al. | 239/526 |
| 5,127,426 | 7/1992 | D'Archambaud | 137/113 |
| 5,199,748 | 4/1993 | Jung et al. | 285/136 |
| 5,333,882 | 8/1994 | Azibert et al. | 277/1 |
| 5,335,688 | 8/1994 | Caviar | 251/26 |
| 5,411,298 | 5/1995 | Pollack | 285/94 |
| 5,499,527 | 3/1996 | Kuehn et al. | 73/4 R |
| 5,520,209 | 5/1996 | Goins et al. | 137/246 |

FOREIGN PATENT DOCUMENTS

| | | |
|---|---|---|
| 952755 | 3/1964 | United Kingdom . |
| 954479 | 4/1964 | United Kingdom . |
| 988952 | 4/1965 | United Kingdom . |
| 1171178 | 11/1969 | United Kingdom . |
| WO 84/04387 | 11/1984 | WIPO . |

Primary Examiner—Hezron E. Williams
Assistant Examiner—Jay L. Politzer
Attorney, Agent, or Firm—Foley & Lardner

[57] ABSTRACT

A monitoring system for a fluid flow connector such as for oil or gas production flow is able to maintain the integrity of the seal at a junction between fluid conduits and generate a warning signal or activate a secondary seal in the event of main seal failure.

The monitoring system of the invention is used with a hydraulic seal to which barrier fluid is supplied under pressure. The pressure of the barrier fluid is sensed at the seal and compared to the applied pressure. A drop in pressure indicates a leaking seal and a warning signal may be generated and/or a secondary seal brought into operation.

The system is particularly useful when a plurality of junctions of conduits are present in a connector. Independent supplies of barrier fluid to the seals at each junction are provided so that identification of a leaking seal is accurate and timely.

8 Claims, 2 Drawing Sheets

MONITORING SYSTEM FOR HIGH PRESSURE FLUID FLOW CONNECTOR

FIELD OF THE INVENTION

The present invention relates to a monitoring system for a high pressure fluid flow connector.

REFERENCE TO COPENDING APPLICATIONS

The invention is particularly applicable to the fluid flow connector described in applicant's co-pending co-filed U.S. patent application Ser. No. 08/559,449, entitled: Fluid Flow Connector, (Agent's Ref. FD38/PL77263), corresponding to UK application 9522325.1, Ser. No. 08/559,581, entitled: High Pressure Fluid Flow Connector (Agent's Ref. FD39/PL77264), corresponding to UK application 9522327.7, with or without the sealing arrangement described in applicant's co-pending and co-filed U.S. application Ser. No. 08/559,356, entitled: Sealing Arrangement (Agent's Ref. FD37/PL77262), corresponding to UK application 9522326.9. The subject matter of these copending applications is incorporated herein by reference.

BACKGROUND OF THE INVENTION

Fluid flow connectors are particularly useful in the oil and gas industry for use in floating buoys supporting subsea oil or gas risers or in transport or storage vessels for example on the deck, or in the hold, of an oil tanker.

These type of connectors are large and heavy pieces of equipment and are in use in harsh conditions and thorough reliability is an important factor in their design and choice. Any breakdown results in enormous costs and loss of production and the downtime of any facility must be minimized. Hence it is important to be able to repair any faults quickly and effectively.

In known fluid flow connectors, for example, as described in U.S. Pat. No. 4,828,292, designers have produced connectors which allow some play between parts so as to reduce mechanical stresses and improve reliability. An improved sealing system for such connectors is known from PCT/NO94/00120 and this has further improved the reliability.

However, nothing in the prior art describes or suggests monitoring the seals of such a connector.

It is an object of the present invention to provide a monitoring system which can detect a seal failure at the earliest opportunity.

SUMMARY OF THE INVENTION

The present invention provides a system for monitoring the integrity of a junction between two conduits carrying a production fluid under high pressure, the arrangement comprising:

a sealing member for the junction a supply of barrier fluid to a side of the seal remote from the production fluid to activate the seal, a pressure sensor for detecting the barrier fluid pressure at the seal, means for activating a secondary seal and/or generating a warning signal if the pressure sensor detects a pressure change indicative of a leaking main seal.

Thus a system may be constructed using the present invention to provide an instantaneous indication of potential leakage. The system is preferably arranged to automatically activate a back-up, secondary seal, but additionally or alternatively a warning signal can be generated.

Where a plurality of conduit junctions are in use, then separate barrier fluid supplies should be applied to each of the main seals for the junctions. In this way, when a main seal fails, not only can the appropriate secondary seal be brought into operation but also a visual signal can indicate which seal in particular has failed.

Thus the repair engineer can be alerted at the earliest possible opportunity and need waste no extraneous expensive downtime in tracing the failure, he can strip down the connector to gain immediate access to the failed seal.

DETAILED DESCRIPTION OF DRAWINGS

Figure 1:
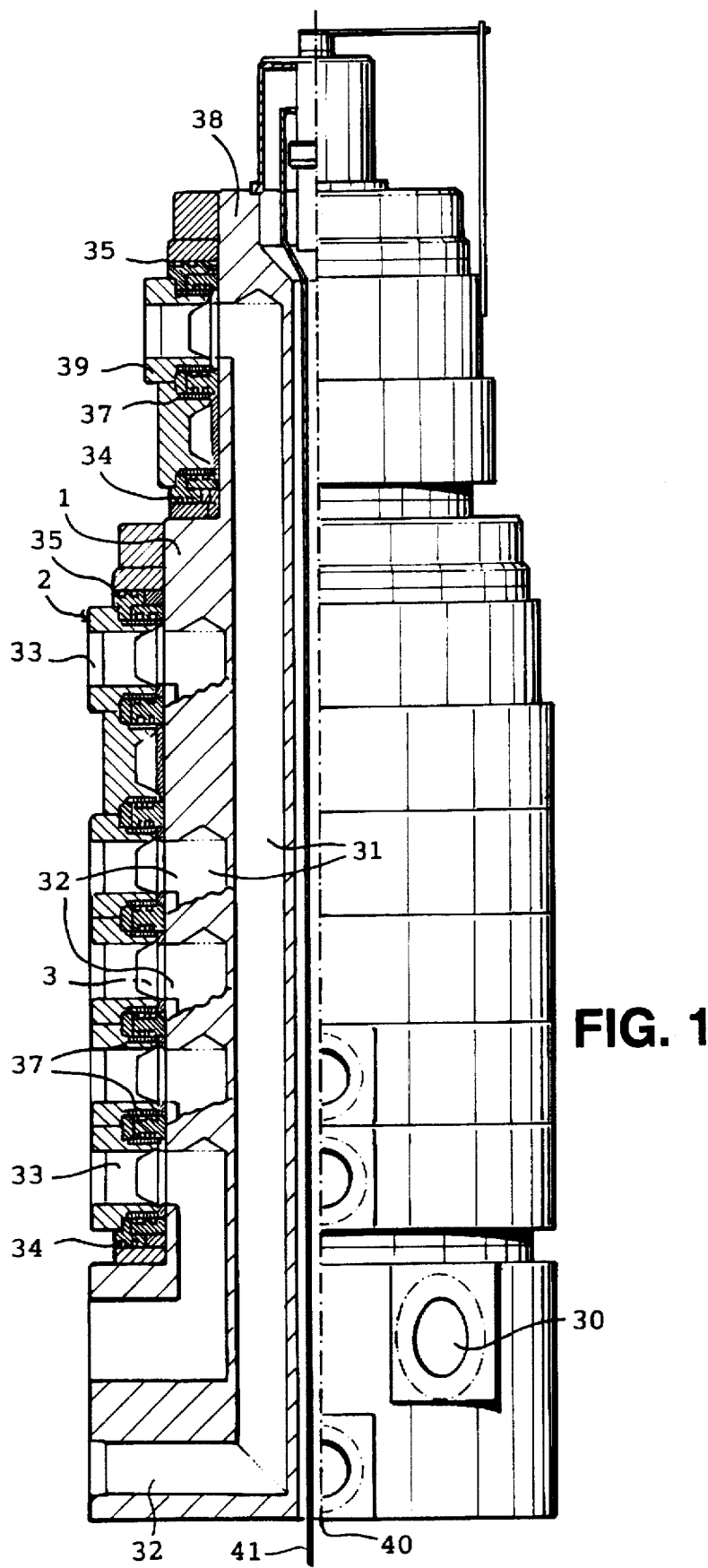
FIG. 1 is a cross-section of a fluid flow connector and specifically a joint between fluid conduits.

FIG. 1 illustrates a high pressure fluid connector. In the left half of the Figure a cross-sectional view is shown. In the cross-sectional view, oppositely directed cross-hatching is used to indicate parts of the connector which are relatively rotational with respect to each other. Thus a male member 1 is denoted by a left to right rising cross-hatching and a female member 2 is denoted by left to right falling cross-hatching. The male member 1 is generally held stationary, for example on a storage or transport vessel to which the oil or gas is being pumped through the connector.

The male core member 1 has several axial bores 31 connecting radial passageways 32 in core element 1 to fluid conduits 33 in the female member 2. The junction of these fluid conduits 33 with the radial passageways 32 in male member 1 is formed as annular grooves 3. In this way the relative rotation of the two members 1 and 2 does not affect the fluid connection between the two.

This junction of the fluid conduits and the passageways is sealed by means of over-pressure double sealing arrangements above and below each junction, coaxial with the annual grooves. These sealing arrangements are indicated generally at 37 and are described in more detail in applicant's co-pending and simultaneously filed U.S. Pat. application Ser. No. 08/559,356 entitled "Sealing Arrangement".

Such a sealing arrangement comprised double pairs of lip-seals each having U-shaped cross-sections and being activated by a high pressure barrier fluid applied to the open side of the sealing ring. The barrier fluid is supplied at a higher pressure to the pressure of the production fluid in the conduit and provides a lubrication for the seal, to facilitate relative rotation of the member 1 and 2 without damage to the seal.

Such a sealing arrangement is provided above and below each annular groove 3.

At the top and bottom of the fluid connector is provided an environment seal 34, 35 which seals a set of fluid carrying conduits against the environment (which will usually but not necessarily exclusively be at atmospheric pressure). Again the environment seal comprised a pair of space U-shaped seals activated by pressure differentials.

In the embodiment shown in FIG. 1 the core element 1 comprises an additional extension portion 38 extending longitudinally above female member 2, and having a smaller diameter. This extension 38 connects with a second female member 39 in the same way as has been described in relation to the first female member 2 and the main part of the core member 1. That is to say that sealing arrangements 37 as well as environment seal 34, 35 are provided. Such a narrower diameter core extension is useful for particularly high pressure fluid flow.

Figure 2:
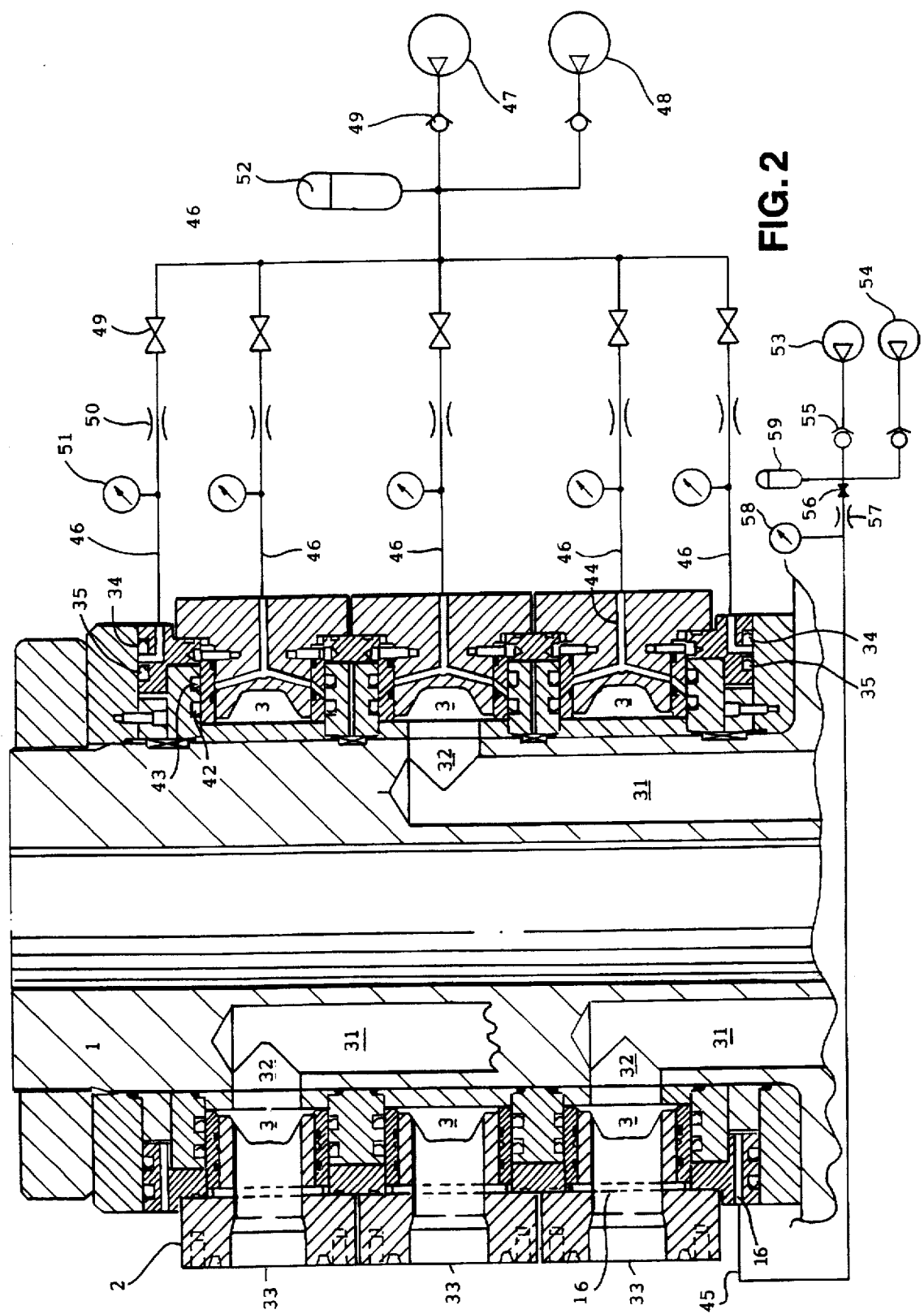
FIG. 2 is a cross-section of a part of the high pressure fluid flow connector of FIG. 1 in more detail and indicates the monitoring system of the present invention schematically.

In FIG. 2 production fluid such as oil or gas flows in axial bores 31 which each connect with an annular groove at the junction between a radial passageway 32 in male member 1 and a fluid conduit 33 in female member 2.

These junctions are sealed by means of sealing arrangements comprising a main seal 42 and a secondary seal 43. These seals are formed of lip-seals with generally U-shaped cross-sections with the opening of the U pointing away from the production fluid (in the embodiment illustrated this is away from central core 1). The U-shaped sealing rings are seated in channels and form rings around the core 1. These are dynamic seals sealing between relatively rotational surfaces so as to allow the female 2 to rotate about core member 1.

The seals are activated by a pressure differential and thus a barrier fluid is supplied to each main seal 42 via a channel 44 formed in each fluid carrying segment of the female member 2. Each segment has its own independently monitorable barrier fluid supply and the pressure of the barrier fluid applied to the main seal is slightly higher than the pressure of the fluid in the conduit. Typically the production fluid in the conduit would be at a pressure of around 500 bar and the barrier fluid could be applied at a pressure of 530 or 540 bar. These values are given as examples only and are not intended to limit the scope of this invention.

The secondary seals 43 are also supplied with barrier fluid through supply channels 16 which are interconnected. The secondary barrier fluid is supplied at the same pressure as the primary barrier fluid i.e. slightly above the pressure of the production fluid flowing in the conduits. In this way the secondary seal "sees" the same pressure on each side of the seal and thus does not actively seal under normal working conditions.

The secondary seals have a common barrier fluid supply 45.

It will also be seen from FIG. 1 that the main environment seals 34 are supplied with barrier fluid from the main barrier fluid source and the secondary environment 35 is supplied with barrier fluid from the secondary barrier fluid supply 45.

The main barrier fluid supply 46 comprises a main barrier fluid pump 47 and standby pump 48. The barrier fluid is pumped through a non-return valve 49 and supplied to each of the segment channels 44 via service valves 49 orifices or flow instructors 50 and monitoring gauge or pressure transmitter 51. An accumulator 52 is also provided to keep the applied pressure constant and avoid activating the pumps constantly.

The secondary barrier fluid supply comprises secondary barrier fluid pump 53 and standby pump 54 supplying secondary barrier fluid through non-return valve 55 and service valve 56, through orifice 57 and pass gauge 58 to channels 16 in female member 2. Again an accumulator 59 is provided.

In operation the main seals 42 seal a junction of the production fluid conduits. The main barrier fluid lubricates the seals 42 and the arrangement is such that female member 2 can rotate around male member 1. Secondary seals 43 do not actively seal under normal operating conditions and thus do not experience any wear.

The main barrier fluid is supplied at a constant pressure and the pressure at each of the main seals is independently monitored by means of dedicated gauges 51. If a main seal fails, then the main barrier fluid will leak into the production fluid and there will be a loss of pressure in the relevant supply channel 44. This loss of pressure is detected by the relevant gauge and alerts the engineer observing the system. However, the loss of pressure at the main seal 42 automatically causes the secondary seal to experience a pressure differential thus activating it to seal the junction of the conduits as a substitute for the main seal. The secondary seal operates in exactly the same way providing a lubrication and allowing relative movement of the core 1 and the female member 2. Hence there is no need to shut down the connector immediately. Repair of the main seal 42 can be left for example until the next regular service is scheduled or until weather conditions improve. When the system is shut down to repair the main seal, the engineer already knows which seal has failed and can take the appropriate action.

This is of course a considerable advantage for a connector of this sort particularly in the high volume and difficult environment in which the oil and gas industry operate.

If any of the secondary seals fail, this will be indicated in a similar manager by a pressure drop on gauge 58. In the particular embodiment shown there is no indication of which of the secondary seals has failed. This would not normally be necessary but it is within the capabilities of any persons skilled in the art, without inventive input, to use separate gauges to indicate the pressure levels in each second seal if this is required in particularly demanding circumstances.

What I claim is:

1. A monitoring system for a fluid flow connector, the connector comprising:

two conduits carrying a production fluid under a first pressure, a junction linking the two conduits for fluid flow, a hydraulic main seal arranged at said junction, the main seal having a first side fluidly communicating with the production fluid and a second side remote from the production fluid, a secondary seal spaced from the main seal at the junction and having a first side in fluid communication with said second side of the main seal and a second side remote from the main seal, the monitoring system comprising:

means to supply a first barrier fluid at a second pressure higher than the first pressure between the main seal and the secondary seal, which activates the main seal, means to supply a second barrier fluid at said second pressure to the remote side of said second seal, a pressure sensor for monitoring the barrier fluid pressure between the main and the secondary seal, means for comparing the monitored pressure to the second pressure so that said secondary seal is activated if the pressure of the barrier fluid between the main seal and the secondary seal decreases, and means for generating a warning signal if the pressure sensor detects a pressure fall indicative of a leaking main seal.

2. The system of claim 1, wherein said second pressure is between 2 and 10% higher than said first pressure.

3. The system of claim 1, wherein the second pressure is between 3 and 6% higher.

4. The system of claim 1, wherein the pressure sensor comprises a gauge and a flow constriction.

5. The system of claim 1 further comprising a plurality of secondary seals and a secondary barrier fluid supply to said secondary seals, the secondary supply is independent of the main seal supply.

6. The system of claim 5, wherein the secondary barrier fluid supply is common to all the secondary seals.

7. A monitoring system for monitoring respective ones of a plurality of junctions between fluid conduits wherein there is a separate barrier fluid supply to the main seal at each junction for a fluid flow connector, the connector comprising a plurality of junctions between fluid flow conduits for production fluid, each junction having a respective hydraulic main seal having a first side fluidly communicating with the production fluid and a second side remote from the production fluid, and a plurality of means to supply a barrier fluid to respective ones of said second sides of the main seals to activate the seals, the monitoring system comprising for each main seal a pressure sensor for monitoring the barrier fluid pressure at the second side of the seal, means for comparing the monitored pressure to the applied pressure, and means for generating a signal when the pressure sensor detects a pressure change indicative of a leaking main seal.

8. A monitoring system for a fluid flow connector, the connector comprising:

two conduits carrying a production fluid under a first pressure, a junction linking the two conduits for fluid flow, a hydraulic main seal arranged at said junction, the main seal having a first side fluidly communicating with the production fluid and a second side remote from the production fluid, a secondary seal spaced from the main seal at the junction and having a first side in fluid communication with said second side of the main seal and a second side remote from the main seal, the monitoring system comprising:

means to supply a first barrier fluid at a second pressure higher than the first pressure between the main seal and the secondary seal, which activates the main seal, means to supply a second barrier fluid at said second pressure to the remote side of said second seal, a pressure sensor for monitoring the barrier fluid pressure between the main and the secondary seal, means for comparing the monitored pressure to the second pressure so that said secondary seal is activated if the pressure of the barrier fluid between the main seal and the secondary seal decreases, and wherein the barrier fluid supply comprises a pump, a non-return valve, an accumulator and means for monitoring the level of fluid in the accumulator and activating the pump if the level of fluid in the accumulator attains a predetermined level.

\* \* \* \* \*